(12) United States Patent
Okugawa (10) Patent No.: US 7,715,078 B2
(45) Date of Patent: May 11, 2010

(54) OPTICAL SCAN DEVICE, OPTICAL SCAN TYPE MICROSCOPE, OBSERVATION METHOD, CONTROL DEVICE, AND CONTROL PROGRAM

(75) Inventor: Hisashi Okugawa, Yokosuka (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/145,996

(22) Filed: Jun. 25, 2008

(65) Prior Publication Data

US 2008/0316561 A1 Dec. 25, 2008

Related U.S. Application Data

(63) Continuation of application No. PCT/JP2006/324326, filed on Dec. 6, 2006.

(30) Foreign Application Priority Data

Dec. 28, 2005 (JP) ............................. 2005-378098

(51) Int. Cl.
*G02B 26/12* (2006.01)

(52) U.S. Cl. .............. 359/212.1; 359/201.2; 359/213.1; 359/381; 359/388

(58) Field of Classification Search ................ 359/368, 359/381, 385, 388, 201.2, 202.1, 203.1, 212.1, 359/212.2, 213.1
See application file for complete search history.

(56) References Cited

U.S. PATENT DOCUMENTS

| | | |
|---|---|---|
| 5,283,433 A | 2/1994 | Tsien |
| 5,424,765 A | 6/1995 | Fujii et al. |
| 5,936,764 A * | 8/1999 | Kobayashi ................ 359/385 |
| 6,211,988 B1 | 4/2001 | Engelhardt et al. |

FOREIGN PATENT DOCUMENTS

| | | | |
|---|---|---|---|
| JP | 61-219919 A | | 9/1986 |
| JP | 04-184412 A | | 7/1992 |
| JP | 05-164980 | * | 6/1993 |
| JP | 05-164980 A | | 6/1993 |
| JP | 6-201999 A | | 7/1994 |

(Continued)

OTHER PUBLICATIONS

Leica Microsystems catalog "Tandem Scanner—Leica TCS SP5—The Broadband Confocal High Speed and High Resolution—All in One" Order No. 1593102108, Aug. 2005.

*Primary Examiner*—Joshua L Pritchett
(74) *Attorney, Agent, or Firm*—Miles & Stockbridge P.C.

(57) ABSTRACT

It is an object to realize smooth switching between free scanning and high speed scanning in a light scanning apparatus and a light scanning microscope. To attain the object, a light scanning apparatus includes at least three mirror scanners disposed at predetermined positions of a light path for light scanning, and a light path switching unit switching the light path between a light path in which a highest-speed mirror scanner among the mirror scanners is valid and a light path in which the highest-speed mirror scanner is invalid. Therefore, the switching between a free scanning mode and a high speed scanning mode is performed by the driving of the light switching unit and involves no movement of galvanometer scanners. In addition, since the resonant galvanometer scanner is invalid during the free scanning mode, it is possible to make the resonant galvanometer scanner on standby.

12 Claims, 4 Drawing Sheets

FOREIGN PATENT DOCUMENTS

| | | |
|---|---|---|
| JP | 7-43631 A | 2/1995 |
| JP | 2001-506378 A | 5/2001 |
| JP | 2003-136270 A | 5/2003 |
| JP | 2004-138947 A | 5/2004 |
| JP | 2005-017642 A | 1/2005 |

\* cited by examiner

OPTICAL SCAN DEVICE, OPTICAL SCAN TYPE MICROSCOPE, OBSERVATION METHOD, CONTROL DEVICE, AND CONTROL PROGRAM

CROSS-REFERENCE TO RELATED APPLICATION

This application is a Continuation Application of International Application No. PCT/JP2006/324326, filed Dec. 6, 2006, designating the U.S., in which the International Application claims a priority date of Dec. 28, 2005, based on prior filed Japanese Patent Application No. 2005-378098, the entire contents of which are incorporated herein by reference.

BACKGROUND

1. Field

The present invention relates to a light scanning apparatus and a light scanning microscope using the same. The present invention further relates to an observation method utilizing the light scanning microscope, a controlling apparatus, and a controlling program.

2. Description of the Related Art

In order to improve imaging speed of a laser scanning confocal microscope, the use of a resonant galvanometer scanner has been conventionally proposed (see a patent document 1 and so on). Since the resonant galvanometer scanner oscillates a scan mirror with a resonant frequency of an oscillating system, its oscillation frequency can be ten times as high as that of a controllable galvanometer scanner.

However, in the resonant galvanometer scanner, the scan mirror is rotated with a natural resonant frequency by a sinusoidal wave and the center of the rotation, and the speed of the rotation, which can be changed in the controllable galvanometer scanner, cannot be feely changed.

Under such circumstances, a light scanning apparatus including both a resonant galvanometer scanner and a controllable galvanometer scanner was proposed (see a non-patent document 1, a patent document 2, and so on).

In the non-patent document 1, the resonant galvanometer scanner and the controllable galvanometer scanner are disposed so as to be alternatively selectable. Therefore, when high speed imaging is required, the former is disposed in a light path, and when a scanning area needs to be set, the latter is disposed in the light path.

In the patent document 2, since an oscillating system of the resonant galvanometer scanner is incorporated in an oscillating system of the controllable galvanometer scanner, the same scan mirror can be oscillated in both the resonant oscillating system and the controllable oscillating system. Therefore, when high speed imaging is required, the resonant oscillating system is driven, and when a scanning area needs to be set, the controllable oscillating system has only to be driven.

Patent document 1: Japanese Unexamined Patent Application Publication No. H6-201999

Patent document 2: Japanese Unexamined Patent Application Publication No. 2005-17642

Non-patent document 1: Leica Microsystems catalog "Tandem Scanner TCS SP5", Order no: 1593102108, August 2005, Leica Microsystems However, in the non-patent document 1, the scanner switching takes time due to the need for moving the scanners. On the other hand, in the patent document 2, the scanners do not have to be moved, but in the oscillating system of the resonant galvanometer scanner, it takes time before an oscillation state is stabilized after the start of the driving, and it also takes time before the oscillation ceases after the stop of the driving, and therefore, the observation can be actually started with an about several second time lag after the scanner switching.

SUMMARY

In view of the above, it is an object of the present invention to provide a light scanning apparatus capable of smoothly switching between free scanning and high speed scanning, and a light scanning microscope using the same.

It is another object of the present invention to provide an observation method effectively utilizing the light scanning microscope of the present invention, a controlling apparatus, and a controlling program.

A light scanning apparatus of the present invention includes at least three mirror scanners disposed at predetermined positions of a light path for light scanning, and a light path switching unit switching the light path between a light path in which a highest-speed mirror scanner among the mirror scanners is valid and a light path in which the highest-speed mirror scanner is invalid, in which the light path in which the highest-speed mirror scanner is valid and the light path in which the highest-speed mirror scanner is invalid form different light paths.

The light path is switched by insertion or rotation of the light switching unit.

Preferably, the highest-speed mirror scanner is one resonant galvanometer scanner for main scanning, and the other scanners are a pair of controllable galvanometer scanners for main scanning and vertical scanning.

Further preferably, a collecting lens collecting light directed toward a plane to be scanned is disposed between the highest-speed mirror scanner and the other scanners, and the plane to be scanned, and the disposition position of the highest-speed mirror scanner and the disposition positions of the other scanners are both set substantially conjugate with a pupil of the collecting lens.

Further, a light scanning microscope of the present invention is a microscope in which the abovementioned light scanning apparatus scans a plane of a specimen by light from a light source, and a detecting unit detects light generated on the plane of the specimen.

The detecting unit may confocally detect the light generated on the plane of the specimen.

Further, an observation method of the present invention is an observation method utilizing the light scanning microscope of the present invention, the method including the operations of setting the light scanning microscope to a state where the highest-speed mirror scanner is invalid and irradiating part of the plane of the specimen with light, switching the light scanning microscope to a state where the highest-speed mirror scanner is valid at a timing immediately after the irradiation, and stabilizing an oscillation state of the highest-speed mirror scanner in advance and starting high speed imaging of the plane of the specimen at a timing immediately after the switching.

A controlling apparatus of the present invention is a controlling apparatus applied for the light scanning microscope of the present invention, the controlling apparatus executing the operations of setting the light scanning microscope to a state where the highest-speed mirror scanner is invalid and irradiating part of the plane of the specimen with light, switching the light scanning microscope to a state where the highest-speed mirror scanner is valid at a timing immediately after the irradiation, and stabilizing an oscillation state of the highest-speed mirror scanner in advance and starting high speed imaging of the plane of the specimen at a timing immediately after the switching.

A computer-readable carrier medium carrying a controlling program of the present invention is a controlling program for a computer connected to the light scanning microscope of the present invention, the computer-readable carrier medium carrying the controlling program including the operations of setting the light scanning microscope to a state where the highest-speed mirror scanner is invalid and irradiating part of the plane of the specimen with light, switching the light scanning microscope to a state where the highest-speed mirror scanner is valid at a timing immediately after the irradiation, and stabilizing an oscillation state of the highest-speed mirror scanner in advance and starting high speed imaging of the plane of the specimen at a timing immediately after the switching.

According to the present invention, a light scanning apparatus capable of smoothly switching between free scanning and high speed scanning and a light scanning microscope using the same are realized. Further, the present invention realizes an observation method effectively utilizing the light scanning microscope of the present invention, a controlling apparatus, and a controlling program.

DETAILED DESCRIPTION OF THE EMBODIMENTS

First Embodiment

A first embodiment of the present invention will be described. This embodiment is an embodiment of a laser scanning microscope system.

First, the structure of the system will be described.

Figure 1:
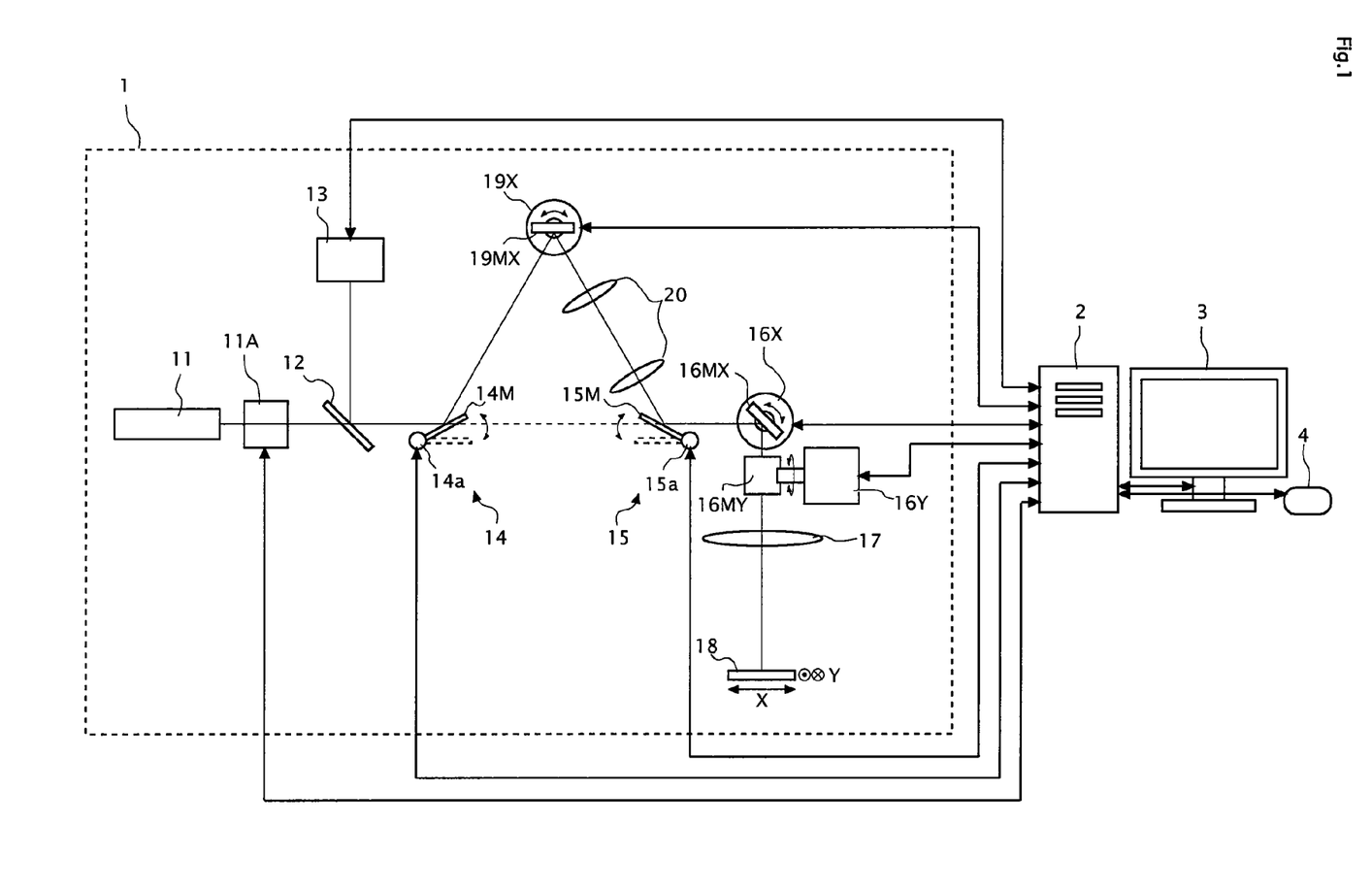
FIG. 1 is a structural view of a system of a first embodiment.

FIG. 1 is a structural view of this system. As shown in FIG. 1, in this system, a laser scanning microscope 1, a computer 2, a display 3, an input device 4, and so on are disposed.

In the laser scanning microscope 1, a monochromatic or quasi-monochromatic light source 11, a light modulator 11A, a beam splitter 12, a light detector 13, a controllable galvanometer scanner 16X for main scanning (X scanning), a controllable galvanometer scanner 16Y for vertical scanning (Y scanning), a collecting lens 17, a sample (specimen) 18, a resonant galvanometer scanner 19X for main scanning (X scanning), a relay optical system 20, light path switching mechanisms 14, 15, a not-shown light deflecting mirror, and so on are disposed.

The light modulator 11A is an acoustic optic element (AOM) or the like and is a device for high speed on/off control and luminance setting of the light source 11. This light modulator 11A is capable of adjusting the luminance of the light source 11 at least in two stages to luminance (low luminance) suitable for later-described imaging and luminance (high luminance) suitable for later-described light stimulation.

The light path switching mechanism 14 includes a switching mirror 14M and a high speed actuator 14a such as a solenoid or a voice coil inserting/separating the switching mirror 14M into/from a light path. Similarly, the light path switching mechanism 15 includes a switching mirror 15M and a high speed actuator 15a such as a solenoid or a voice coil inserting/separating the switching mirror 15M into/from the light path. By driving the light path switching mechanisms 14, 15 via these actuators 14a, 15a, it is possible to quickly switch the laser scanning microscope 1 between a high speed scanning mode and a free scanning mode, which will be described below.

To set the laser scanning microscope 1 to the high speed scanning mode, the switching mirrors 14M, 15M are both inserted in the light path as shown by the solid line in the drawing. At this time, the resonant galvanometer scanner 19X becomes valid, and light emitted from the light source 11 sequentially passes through the light modulator 11A, the beam splitter 12, the light path switching mechanism 14, the resonant galvanometer scanner 19X, the relay optical system 20, the light path switching mechanism 15, the controllable galvanometer scanner 16X, the controllable galvanometer scanner 16Y, and the collecting lens 17 and is collected on the sample 18 to form a spot. In the light path arrangement in FIG. 1, the light deflecting mirror is required between the controllable galvanometer scanner 16Y and the collecting lens 17 but its illustration is omitted. Light which is generated by the spot on the sample 18 at this time, returns to the beam splitter 12 through the same light path, is guided to the light detector 13 side, and is detected by the light detector 13.

A disposition position of a scan mirror 16MX of the controllable galvanometer scanner 16X and a disposition position of a scan mirror 16MY of the controllable galvanometer scanner 16Y need to be set conjugate with a pupil of the collecting lens 17. Therefore, it is assumed here that the scan mirror 16MX and the scan mirror 16MY are close to each other and are positioned close to the pupil of the collecting lens 17. Further, a disposition position of a scan mirror 19MX of the resonant galvanometer scanner 19X also needs to be set conjugate with the pupil of the collecting lens 17. Therefore, it is assumed here that the disposition position of the scan mirror 19MX and the pupil of the collecting lens (or the centers of the scan mirrors 16MX, 16MY) are connected in a conjugate relation via the relay optical system 20.

In this high speed scanning mode, when the scan mirror 19MX of the resonant galvanometer scanner 19X rotates, the spot on the sample 18 reciprocates in the main scanning direction (X direction). Incidentally, since the scan mirror 19MX is of a resonant type, its rotational frequency is high, for example, 10 kHz. Further, in this high speed scanning mode, when a disposition angle of the scan mirror 16MX of the controllable galvanometer scanner 16X is changed, the spot on the sample 18 moves in the main scanning direction (X direction), and when a disposition angle of the scan mirror 16MY of the controllable galvanometer scanner 16Y is changed, the spot on the sample 18 moves in the vertical scanning direction (Y direction). Incidentally, since the scan mirror 16MY is of a controllable type, its rotational frequency is low, for example, 1 kHz at the highest.

Figure 2:
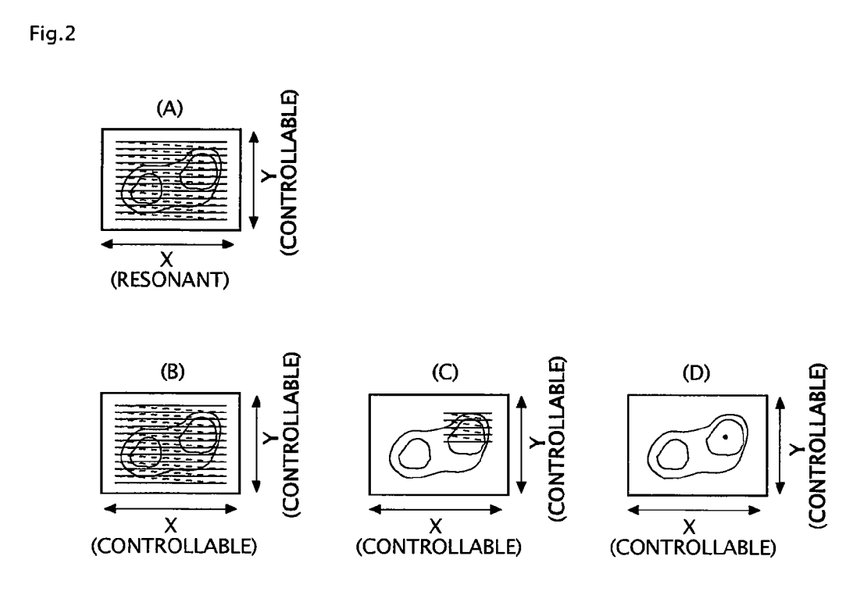
FIG. 2 is a view to explain a high speed scanning mode and a free scanning mode.

Therefore, in the high speed scanning mode, it is possible to execute high speed imaging of the sample 18 by fixing the disposition angle of the scan mirror 16MX of the controllable galvanometer scanner 16X at a reference angle and synchronously controlling the resonant galvanometer scanner 19X, the controllable galvanometer scanner 16Y, the light detector 13, and the light modulator 11A (see FIG. 2(A)). Incidentally, in this high speed scanning mode, it is possible to arbitrarily change (offset) a light scanning area on the sample 18 by fixing the disposition angle of the scan mirror 16MX at an arbitrary angle and controlling the center of an angle change range of the scan mirror 16MY to an arbitrary angle.

To set the laser scanning microscope 1 to the free scanning mode, the switching mirrors 14M, 15M are both separated from the light path as shown by the dotted line in the drawing. At this time, the resonant galvanometer scanner 19X becomes invalid, and light emitted from the light source 11 sequentially passes through the light modulator 11A, the beam splitter 12, the controllable galvanometer scanner 16X, the controllable galvanometer scanner 16Y, and the collecting lens 17 and is collected on the sample 18 to form a spot. Light generated by the spot, when returning to the beam splitter 12 through the same light path, is guided to the light detector 13 side.

In this free scanning mode, even the oscillation of the scan mirror 19MX of the resonant galvanometer scanner 19X causes no change in the spot on the sample 18, but when the disposition angle of the scan mirror 16MX of the controllable galvanometer scanner 16X or the scan mirror 16MY of the controllable galvanometer scanner 16Y is changed, the spot on the sample 18 moves in the main scanning direction (X direction) or in the vertical scanning direction (Y direction).

Therefore, in the free scanning mode, it is possible to execute low speed imaging of the sample 18 by synchronously controlling the controllable galvanometer scanner 16X, the controllable galvanometer scanner 16Y, the light detector 13, and the light modulator 11A (see FIG. 2(B)). At this time, it is further possible to arbitrarily set the center position and size of a light scanning area on the sample 18 by controlling an angle change range of the scan mirror 16MX of the controllable galvanometer scanner 16X and an angle change range of the scan mirror 16MY of the controllable galvanometer scanner 16Y (see FIG. 2(C)). It is further possible to fix the spot on the sample 18 at a given one point by fixing the disposition angle of the scan mirror 16MX and the disposition angle of the scan mirror 16MY at arbitrary angles (see FIG. 2(D)).

In the above-described laser scanning microscope 1, the switching between the high speed scanning mode and the free scanning mode is realized by driving the light path switching mechanisms 14, 15 and involves no movement of the galvanometer scanners. This can reduce the time required for the switching.

Moreover, during a period in which the laser scanning microscope 1 is set to the free scanning mode, the resonant galvanometer scanner 19X is invalid, and as a result, the resonant galvanometer scanner 19X can be constantly kept on standby (that is, the oscillation of the scan mirror 19MX can be kept stable). Therefore, being free from the time lag occurring in the conventional examples, the laser scanning microscope 1 can smoothly perform the switching.

Further, in the laser scanning microscope 1, since the resonant galvanometer scanner 19X and the controllable galvanometer scanners 16X, 16Y are arranged in series, the light scanning area on the sample 18 during the high speed scanning mode (that is, the high speed imaging area) can be arbitrarily offset.

Here, the parts of the laser scanning microscope 1 such as the light path switching mechanisms 14, 15, the light modulator 11A, the resonant galvanometer scanner 19X, the controllable galvanometer scanners 16X, 16Y, and the light detector 13 are controlled by the computer 32.

The computer 2 controls each of the parts according to an instruction which is input from a user via the input device 4, and executes the abovementioned mode switching processing while keeping the resonant galvanometer scanner 19X on standby. The computer 2 further executes processing operations such as the high speed imaging in the high speed scanning mode, the low speed imaging in the free scanning mode, saving of images created by these imaging operations, and display of the images on the display 3. The computer 2 further executes light stimulus observation processing, which will be described below, when given an instruction for light stimulus observation from a user. Control programs necessary for the processing operations are installed in the computer 2 in advance.

Next, the light stimulus observation processing by the computer 2 will be described.

Figure 3:
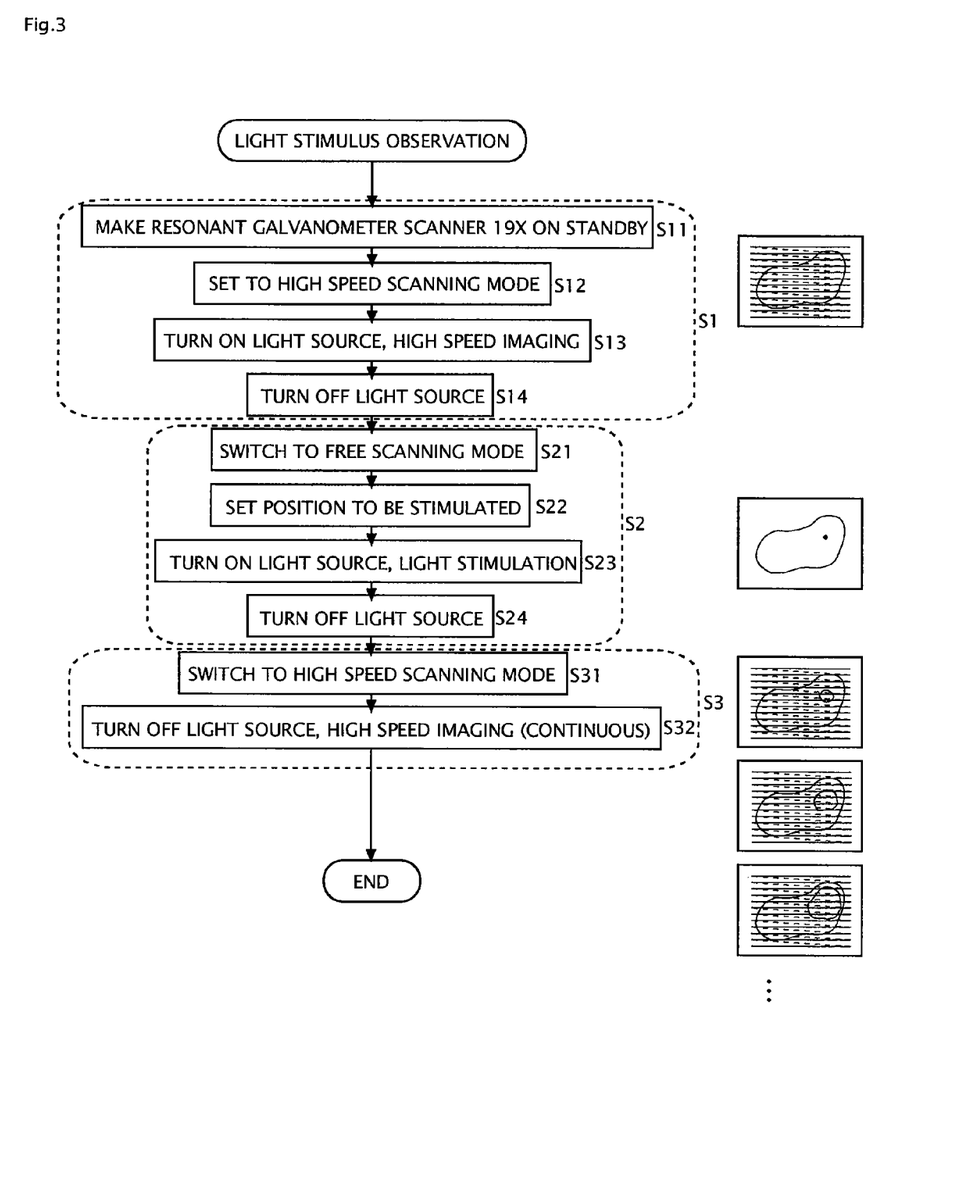
FIG. 3 is a flowchart showing the flow of light stimulus observation processing.

FIG. 3 is a flowchart showing the flow of the light stimulus observation processing. The drawings shown on the right in FIG. 3 are schematic views showing states of the sample 18 at respective steps.

As shown in FIG. 3, in the light stimulus observation processing, imaging before light stimulation (step S1), the light stimulation (step S2), and imaging after the light stimulation (step S3) are successively executed. These steps will be described in the order of events.

Imaging before the light stimulation (step S1):

The computer 2 makes the resonant galvanometer scanner 19X on standby in advance (step S11), and thereafter sets the laser scanning microscope 1 to the high speed scanning mode to validate the resonant galvanometer scanner 19X (step S12). Next, the computer 2 turns on the light source 11 with low luminance (luminance suitable for the imaging) to execute the high speed imaging (by the resonant galvanometer scanner 19X and the controllable galvanometer scanner 16Y) (step S13), and turns off the light source 11 upon completion of the imaging (step S14). An image of the sample 18 created at this time is displayed on the display 3. The user designates a desired position on the sample 18 to the computer 2 via the input device 4 while visually checking the display 3.

Light stimulation (step S2):

Subsequently, the computer 2 switches the laser scanning microscope 1 to the free scanning mode to invalidate the resonant galvanometer scanner 19X (step S21). The computer 2 further gives an instruction to the controllable galvanometer scanners 16X, 16Y to adjust the disposition angles of the scan mirrors 16MX, 16MY so that the position of the spot on the sample 18 coincides with the position designated by the user (step S22). Upon completion of the adjustment, the computer 2 turns on the light source 11 with high luminance (luminance suitable for the light stimulation) to give a light stimulus to the sample 18 (step S23), and turns off the light source 11 upon completion of the light stimulation (step S24).

Imaging after the light stimulation (step S3):

Subsequently, the computer 2 switches the laser scanning microscope 1 to the high speed scanning mode again to validate the resonant galvanometer scanner 19X (step S31). Subsequently, the computer 2 turns on the light source 11 with low luminance (luminance suitable for the imaging) to start the high speed imaging (by the resonant galvanometer scanner 19X and the controllable galvanometer scanner 16Y) (step S32). This high speed imaging is executed continuously, and images of the sample 18 created at this time are sequentially displayed on the display 3. The user observes how the sample 18 changes after the light stimulus is given while visually checking the display 3.

In the above-described light stimulus observation processing of this embodiment, the computer 2 executes the light stimulation while setting the laser scanning microscope 1 to the free scanning mode (step S2), and immediately thereafter, switches the laser scanning microscope 1 to the high speed scanning mode (step S31) to start the high speed imaging (step S32). Further, prior to the switching (step S31), the computer 2 makes the resonant galvanometer scanner 19X on standby in advance (step S11).

Therefore, the mode switching is realized smoothly. Actually, the time lag between the end of the light stimulation (step S23) and the start of the subsequent high speed imaging (step S32) is reduced to only the time required for the mode switching. Therefore, according to this light stimulus observation processing, a reaction of the sample 18 immediately after the light stimulation (see the schematic views in FIG. 3) can be surely observed.

In addition, in this light stimulus observation processing, the change of the sample 18 after the light stimulation can be observed in detail since the high speed imaging is continuously performed after the light stimulation (step S32). For example, in the high speed imaging, the frame rate can be increased to about 30 frames/second, assuming that the image size of one frame is 512 pixels×512 pixels, for instance.

Incidentally, in the light stimulus observation processing of this embodiment, one point on the sample 18 is light-stimulated, but a partial region on the sample 18 may be light-stimulated. In this case, this region is light-scanned under the synchronous control of the controllable galvanometer scanners 16X, 16Y at step S23.

Further, in the light stimulus observation processing of this embodiment, lights with the same wavelength are used for the light stimulation and the imaging, but lights with different wavelengths may be used. In this case, it is preferable to use a white light source as the light source 11 and use a device such as an acoustic optic tunable filter (AOTF) capable of setting the wavelength as the light modulator 11A. This enables a change of the wavelength at step S23. Alternatively, a plurality of light sources with different wavelengths, which are prepared in advance, may be switchably used. That is, appropriate selection of the kind of the sample 18, light as the light stimulus, and a light stimulation area enables various kinds of light stimulus observations such as FRP, FLIP, and photo activation.

Further, if the laser scanning microscope 1 is provided with a pinhole plate disposed in front of the light detector 13 and with a collecting lens via which a pinhole of the pinhole plate and a light-collected plane on the sample 18 are connected in a conjugate relation, confocal observation of the sample 18 is possible.

Further, fluorescence observation of the sample 18 is possible if a dichroic mirror is used instead of the beam splitter 12, a filter is inserted in a required place around the dichroic mirror, and the sample 18 is marked with a fluorescent substance in advance.

This system may further include a controlling apparatus which is provided exclusively for the laser scanning microscope 1 to execute part or all of the operations of the computer 2. Alternatively, a user may manually execute part or all of the operations of the computer 2. However, the execution by the computer or the controlling apparatus can produce a higher effect.

Second Embodiment

A second embodiment of the present invention will be described. This embodiment is a modified example of the laser scanning microscope 1 of the first embodiment. Here, only what are different will be described.

Figure 4:
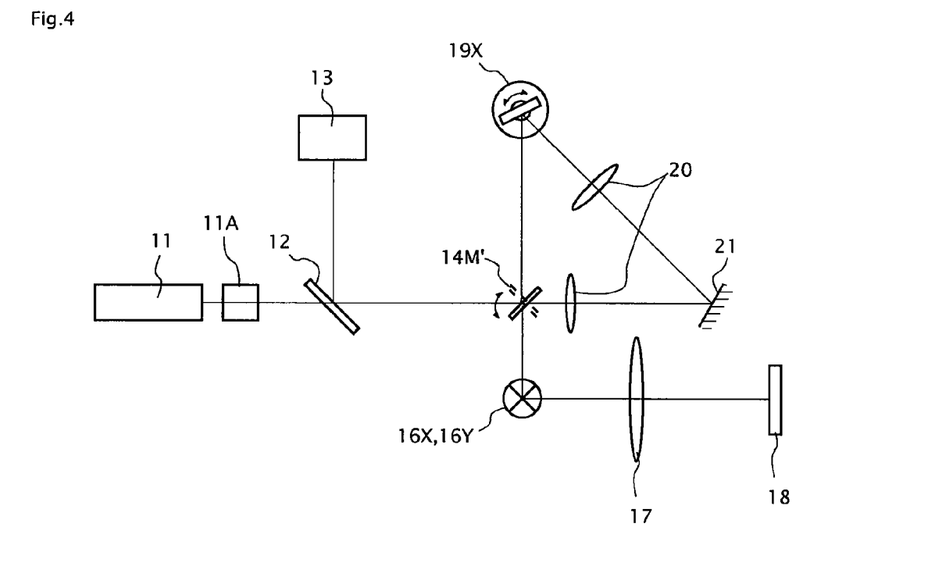
FIG. 4 is a structural view of a laser scanning microscope of a second embodiment.

FIG. 4 is a structural view of a laser scanning microscope of this embodiment. In FIG. 4, the same reference numerals and symbols are used to designate the same elements as the elements shown in FIG. 1. Further, a pair of controllable galvanometer scanners 16X, 16Y are represented by one symbol.

In this laser scanning microscope, a light deflecting mirror 21 is used, and a light path in which a resonant galvanometer scanner 19X is valid and a light path in which the resonant galvanometer scanner 19X is invalid branch off/join at one place, and a switching mirror 14M' is inserted there. The switching mirror 14M' has reflection planes on both sides and can be rotated by 90° at a high speed by a high speed actuator such as a solenoid or a voice coil. This switching mirror 14M' and the actuator include a light path switching mechanism of this embodiment.

To set this laser scanning microscope to a high speed scanning mode, a rotation position of the switching mirror 14M' is set as shown by the solid line in the drawing. In the high speed scanning mode, light emitted from a light source 11 sequentially passes through a light modulator 11A, a beam splitter 12, the switching mirror 14M', the resonant galvanometer scanner 19X, a relay optical system 20, the switching mirror 14M', controllable galvanometer scanners 16X, 16Y, and a collecting lens 17 and is collected on a sample 18.

To set the laser scanning microscope to a free scanning mode, the rotation position of the switching mirror 14M' is changed by 90° as shown by the dotted line in the drawing. In the free scanning mode, light emitted from the light source 11 sequentially passes through the light modulator 11A, the beam splitter 12, the switching mirror 14M', the controllable galvanometer scanners 16X, 16Y, and the collecting lens 17 and is collected on the sample 18.

The laser scanning microscope as structured above can also provide the same effects as those of the first embodiment. This laser scanning microscope further has an advantage that its light path switching mechanism has a simple structure.

Third Embodiment

A third embodiment of the present invention will be described. This embodiment is a modified example of the laser scanning microscope of the second embodiment. Only what are different will be described here.

Figure 5:
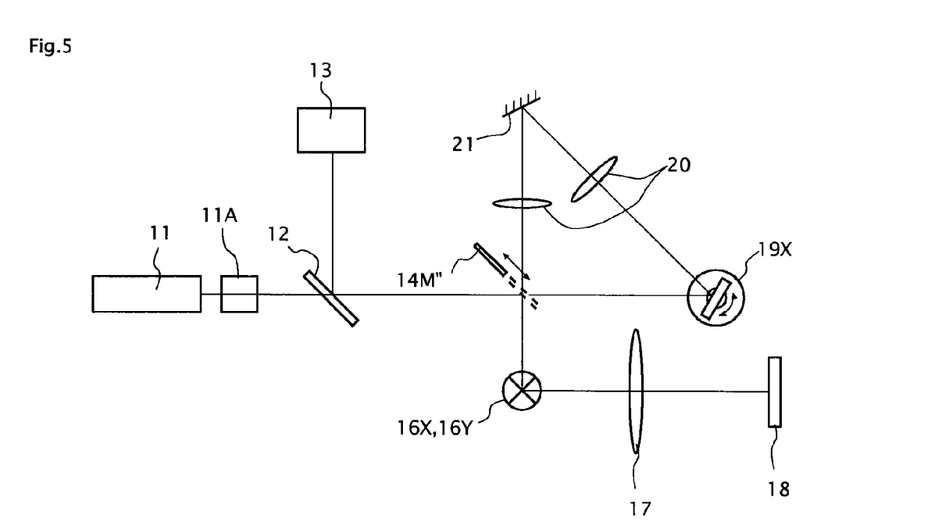
FIG. 5 is a structural view of a laser scanning microscope of a third embodiment.

FIG. 5 is a structural of a laser scanning microscope of this embodiment. In FIG. 5, the same reference numerals and symbols are used to designate the same elements as the elements shown in FIG. 4.

In this laser scanning microscope, a light path in which a resonant galvanometer scanner 19X is valid and a light path in which the resonant galvanometer scanner 19X is invalid also branch off/join at one place, and a switching mirror 14M" is disposed there. The switching mirror 14M" can be inserted in the light path by a high speed actuator such as a solenoid or a voice coil. The switching mirror 14M" and the actuator include a light path switching mechanism of this embodiment.

To set the laser scanning microscope to a high speed scanning mode, the switching mirror 14M" is separated from the light path as shown by the solid line in the drawing. In the high speed scanning mode, light emitted from a light source 11 sequentially passes through a light modulator 11A, a beam splitter 12, a resonant galvanometer scanner 19X, a relay optical system 20, controllable galvanometer scanners 16X, 16Y, and a collecting lens 17 and is collected on a sample 18.

To set the laser scanning microscope to a free scanning mode, the switching mirror 14M" is inserted in the light path as shown by the dotted line in the drawing. In the free scanning mode, light emitted from the light source 11 sequentially passes through the light modulator 11A, the beam splitter 12, the switching mirror 14M', the controllable galvanometer scanners 16X, 16Y, and the collecting lens 17 and is collected on the sample 18.

The laser scanning microscope as structured above can also provide the same effects as those of the second embodiment.

It should be noted that the light path arrangement of the laser scanning microscope 1 and the structure of the light path switching mechanism are not limited to those in the above-described embodiments and are preferably changed as required according to the shape of a casing housing the laser scanning microscope 1, and so on. The same effects as those of the above-described embodiments can be obtained, provided that it is at least possible to switch the light path of the light between the light path in which the resonant galvanometer scanner 19X is valid and the light path in which the resonant galvanometer scanner 19X is invalid. Incidentally, the disposition order of the three galvanometer scanners (the resonant galvanometer scanner 19X and the controllable galvanometer scanners 16X, 16Y) can be changed, provided that the abovementioned conjugate relation is satisfied.

In the description of the first embodiment to the third embodiment, the resonant galvanometer scanner is used as the highest-speed mirror among the scanning scanners, but this is not restrictive, and the highest-speed mirror may be a controllable galvanometer scanner, a polygon mirror, or the like having a controlling circuit capable of high-speed driving. A method for driving the controllable galvanometer scanner at a high speed is a driving method using a sinusoidal wave with a high frequency. In this case, the controllable galvanometer scanner does not necessarily have to be set in a stable state in advance and only needs to be in a drivable state.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A light scanning apparatus comprising:
    at least three mirror scanners disposed at predetermined positions for light scanning; and
    a light path switching unit switching between a first light path, in which a highest-speed mirror scanner among said mirror scanners is valid and a second light path in which said highest-speed mirror scanner is invalid, wherein
    the light switching unit is separated from and structurally independent of the scanners, and
    said first light path and said second light path are different from one another.

2. The light scanning apparatus according to claim 1, wherein
    said light path switching is performed by insertion or rotation of said light switching unit.

3. The light scanning apparatus according to claim 2, wherein:
    said highest-speed mirror scanner is one resonant galvanometer scanner for main scanning; and
    other scanners are a pair of controllable galvanometer scanners for main scanning and vertical scanning.

4. The light scanning apparatus according to claim 1, wherein:
    a collecting lens collecting light directed toward a plane to be scanned is disposed between said highest-speed mirror scanner and the other scanners, and the plane to be scanned; and
    the disposition position of said highest-speed mirror scanner and the disposition positions of said other scanners are both set substantially conjugate with a pupil of said collecting lens.

5. A light scanning microscope comprising:
    the light scanning apparatus according to claim 4 scanning a plane of a specimen by light from a light source; and
    a detecting unit detecting light generated on said plane of the specimen.

6. The light scanning microscope according to claim 5, wherein
    said detecting unit confocally detects the light generated on said plane of the specimen.

7. An observation method utilizing the light scanning microscope according to claim 6, the method comprising the operations of:
    setting said light scanning microscope to a state where said highest-speed mirror scanner is invalid and irradiating part of said plane of the specimen with light;
    switching said light scanning microscope to a state where said highest-speed mirror scanner is valid, at a timing immediately after said irradiation; and
    stabilizing an oscillation state of said highest-speed mirror scanner in advance and starting high speed imaging of said plane of the specimen at a timing immediately after said switching.

8. A controlling apparatus applied for the light scanning microscope according to claim 6, the controlling apparatus executing the operations of:
    setting said light scanning microscope to a state where said highest-speed mirror scanner is invalid and irradiating part of said plane of the specimen with light;
    switching said light scanning microscope to a state where said highest-speed mirror scanner is valid, at a timing immediately after said irradiation; and
    stabilizing an oscillation state of said highest-speed mirror scanner in advance and starting high speed imaging of said plane of the specimen at a timing immediately after said switching.

9. A computer-readable carrier medium carrying a controlling program for a computer connected to the light scanning microscope according to claim 6, the computer-readable carrier medium carrying the controlling program including the operations of:
    setting said light scanning microscope to a state where said highest-speed mirror scanner is invalid and irradiating part of said plane of the specimen with light;
    switching said light scanning microscope to a state where said highest-speed mirror scanner is valid, at a timing immediately after said irradiation; and
    stabilizing an oscillation state of said highest-speed mirror scanner in advance and starting high speed imaging of said plane of the specimen at a timing immediately after said switching.

10. An observation method utilizing the light scanning microscope according to claim 5, the method comprising the operations of:
    setting said light scanning microscope to a state where said highest-speed mirror scanner is invalid and irradiating part of said plane of the specimen with light;
    switching said light scanning microscope to a state where said highest-speed mirror scanner is valid, at a timing immediately after said irradiation; and stabilizing an oscillation state of said highest-speed mirror scanner in advance and starting high speed imaging of said plane of the specimen at a timing immediately after said switching.

11. A controlling apparatus applied for the light scanning microscope according to claim 5, the controlling apparatus executing the operations of:
- setting said light scanning microscope to a state where said highest-speed mirror scanner is invalid and irradiating part of said plane of the specimen with light;
- switching said light scanning microscope to a state where said highest-speed mirror scanner is valid, at a timing immediately after said irradiation; and
- stabilizing an oscillation state of said highest-speed mirror scanner in advance and starting high speed imaging of said plane of the specimen at a timing immediately after said switching.

12. A computer-readable carrier medium carrying a controlling program for a computer connected to the light scanning microscope according to claim 5, the computer-readable carrier medium carrying the controlling program including the operations of:
- setting said light scanning microscope to a state where said highest-speed mirror scanner is invalid and irradiating part of said plane of the specimen with light;
- switching said light scanning microscope to a state where said highest-speed mirror scanner is valid, at a timing immediately after said irradiation; and
- stabilizing an oscillation state of said highest-speed mirror scanner in advance and starting high speed imaging of said plane of the specimen at a timing immediately after said switching.

* * * * *